(12) United States Patent
Bang

(10) Patent No.: US 9,654,012 B2
(45) Date of Patent: May 16, 2017

(54) CONVERTER AND METHOD FOR CONTROLLING THE SAME USING AN OVERCURRENT PROTECTION SWITCH

(71) Applicant: HYUNDAI MOBIS CO., LTD., Seoul (KR)

(72) Inventor: Hyo-Jin Bang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/830,982

(22) Filed: Aug. 20, 2015

(65) Prior Publication Data
US 2016/0079864 A1 Mar. 17, 2016

(30) Foreign Application Priority Data

Sep. 16, 2014 (KR) .................. 10-2014-0122573

(51) Int. Cl.
*H02M 3/335* (2006.01)
*H02M 1/32* (2007.01)
*H02M 1/44* (2007.01)
*H02M 1/00* (2006.01)

(52) U.S. Cl.
CPC ......... *H02M 3/33507* (2013.01); *H02M 1/32* (2013.01); *H02M 1/44* (2013.01); *H02M 2001/0009* (2013.01)

(58) Field of Classification Search
CPC ..................... H02M 3/33507; H02M 1/32
See application file for complete search history.

(56) References Cited

U.S. PATENT DOCUMENTS

| 7,570,498 B2* | 8/2009 | Niijima | H02M 3/33507 363/21.09 |
| 8,208,236 B2* | 6/2012 | Lin | H02M 3/33523 361/18 |
| 2009/0256545 A1* | 10/2009 | Wang | H02M 3/33507 323/299 |
| 2010/0123988 A1* | 5/2010 | Wang | H02M 3/33507 361/93.9 |
| 2012/0056548 A1* | 3/2012 | Duan | H05B 33/0815 315/200 R |
| 2015/0309090 A1* | 10/2015 | Akahane | H03K 17/0828 324/537 |

FOREIGN PATENT DOCUMENTS

KR 10-2007-0074780 A 7/2007

* cited by examiner

*Primary Examiner* — Emily P Pham
(74) *Attorney, Agent, or Firm* — NSIP Law

(57) ABSTRACT

A converter may include a transformer, an overcurrent protection switch configured to be installed at a primary side of the transformer to prevent an overcurrent, a comparator configured to detect a voltage of the overcurrent protection switch to convert the detected voltage into an output current sensing value and compare the output current sensing value with a reference value, and a protection controller configured to normally operate or forcibly turn off the overcurrent protection switch depending on a comparison result of the comparator.

14 Claims, 9 Drawing Sheets

CONVERTER AND METHOD FOR CONTROLLING THE SAME USING AN OVERCURRENT PROTECTION SWITCH

CROSS-REFERENCE(S) TO RELATED APPLICATIONS

This application claims priority to Korean Patent Application No(s). 10-2014-0122573 filed on Sep. 16, 2014, which is(are) incorporated herein by reference in its(their) entirety.

BACKGROUND OF THE INVENTION

Field of the Invention

Exemplary embodiments of the present invention relates to a converter for a green car, and more particularly, to a converter and a method for controlling the same capable of calculating an output current of a Direct Current-Direct Current (DC-DC) converter without using an expensive current sensor directly detecting the output current of the DC-DC converter by installing comparators across an overcurrent protection switch installed at a primary side of a transformer in the DC-DC converter and calculating the output current of the DC-DC converter using an output voltage of the comparators.

Description of Related Art

A converter is used to charge a low voltage battery in a green car. Examples of the converter are a forward type low voltage DC-DC converter, a fly-back type low voltage DC-DC converter and etc.

There is a problem in that the forward type low voltage DC-DC converter needs to use an expensive current sensor 42 to sense a high output current.

The fly-back type DC-DC converter includes a plurality of circuits which have a different control scheme from the low voltage DC-DC converter for a vehicle and are added and therefore manufacturing costs of the DC-DC converter may be increased.

SUMMARY OF THE INVENTION

An embodiment of the present invention is directed to a converter and a method for controlling the same capable of calculating an output current of a direct current-direct current (DC-DC) converter without using an expensive current sensor directly detecting an output current of the DC-DC converter.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

To achieve, the present invention provides a converter capable of calculating an output current of a direct current-direct current (DC-DC) converter without using an expensive current sensor directly detecting an output current of the DC-DC converter.

In accordance with an embodiment of the present invention, a converter includes: a transformer; an overcurrent protection switch configured to be installed at a primary side of the transformer to prevent an overcurrent; a comparator configured to detect a voltage of the overcurrent protection switch to convert the detected voltage into an output current sensing value and compare the output current sensing value with a reference value; and a protection controller configured to normally operate or forcibly turn off the overcurrent protection switch depending on a comparison result of the comparator.

In accordance with another embodiment of the present invention, a method for controlling a converter includes: detecting a voltage of an overcurrent protection switch installed at a primary side of a transformer to prevent an overcurrent; converting, by a comparator, the detected voltage into an output current sensing value and compare the output current sensing value with a reference value; and normally operating or forcibly turning off, by a protection controller, the overcurrent protection switch depending on a comparison result of the comparator.

DESCRIPTION OF SPECIFIC EMBODIMENTS

It is to be noted that technical terms used in the specification are used for describing specific embodiments and do not limit the present invention. In addition, unless indicated otherwise in the specification, it is to be understood that all the technical terms used in the specification are construed as meaning as those that are generally understood by those who are skilled in the art and as excessively comprehensive meanings and excessively reduced meanings. Further, the accompanying drawings are provided to easily understand the technical spirit of the present invention disclosed in the present specification, and therefore the technical spirit is not limited to the accompany drawings. Therefore, it is to be construed that the accompanying drawings include all modifications and replacements included in the technical spirit and the technical scope disclosed in the present specification.

Figure 1:
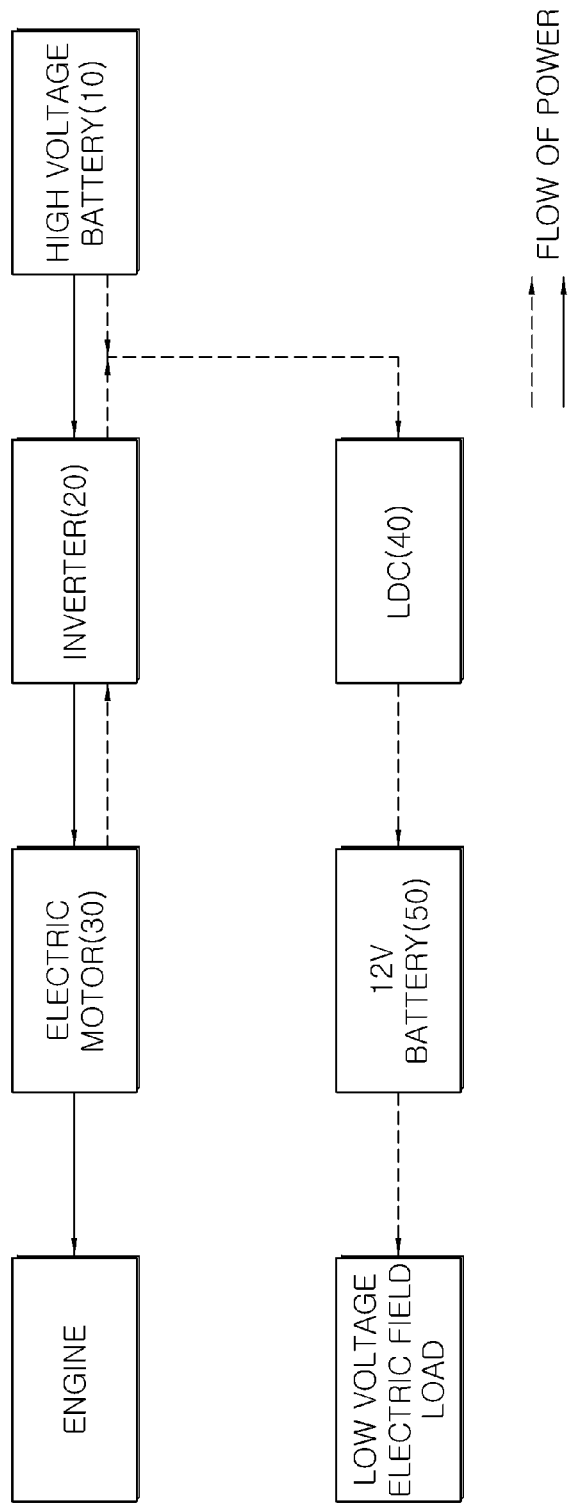
FIG. 1 is a block diagram illustrating a flow of power in a green car.

FIG. 1 is a block diagram illustrating a flow of power in a green car. Referring to FIG. 1, the green car has two operation modes. A first operation mode receives power from a high voltage battery 10 to drive a motor 30 through an inverter 20. Here, the driven motor transfers power to a power divider and a low voltage DC-DC converter 40 connected to the high voltage battery 10 charges a low voltage battery 50.

If a torque is generated in the power divider when a vehicle is decelerated and moves in a downward slope section, a second operation mode operates the motor 30 as a generator by using the torque to charge the high voltage battery 10 through the inverter 20. The low voltage DC-DC converter 40 connected to the high voltage battery 10 charges the low voltage battery 50.

The low voltage DC-DC converter 40 is operated in a forward converter type and a configuration of the forward converter type low voltage DC-DC converter and a current sensing method are as follows.

Figure 2:
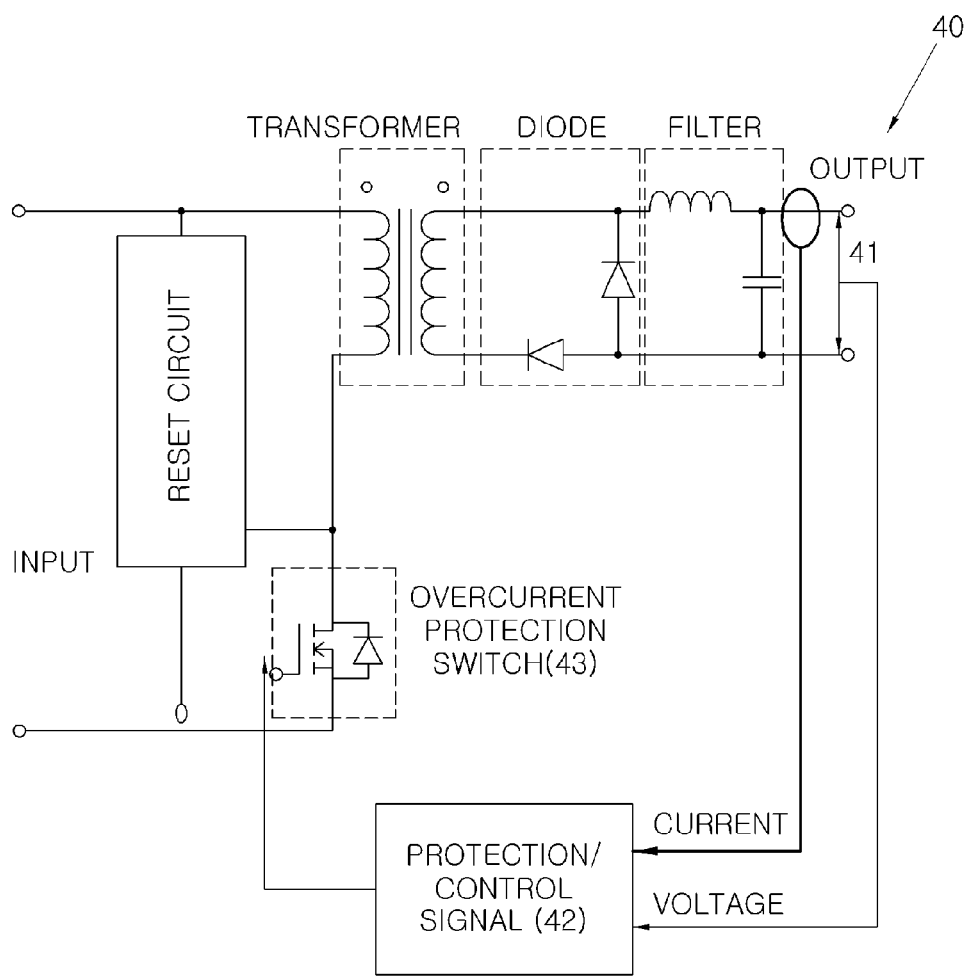
FIG. 2 is a block diagram illustrating a DC-DC converter circuit.
Figure 3:
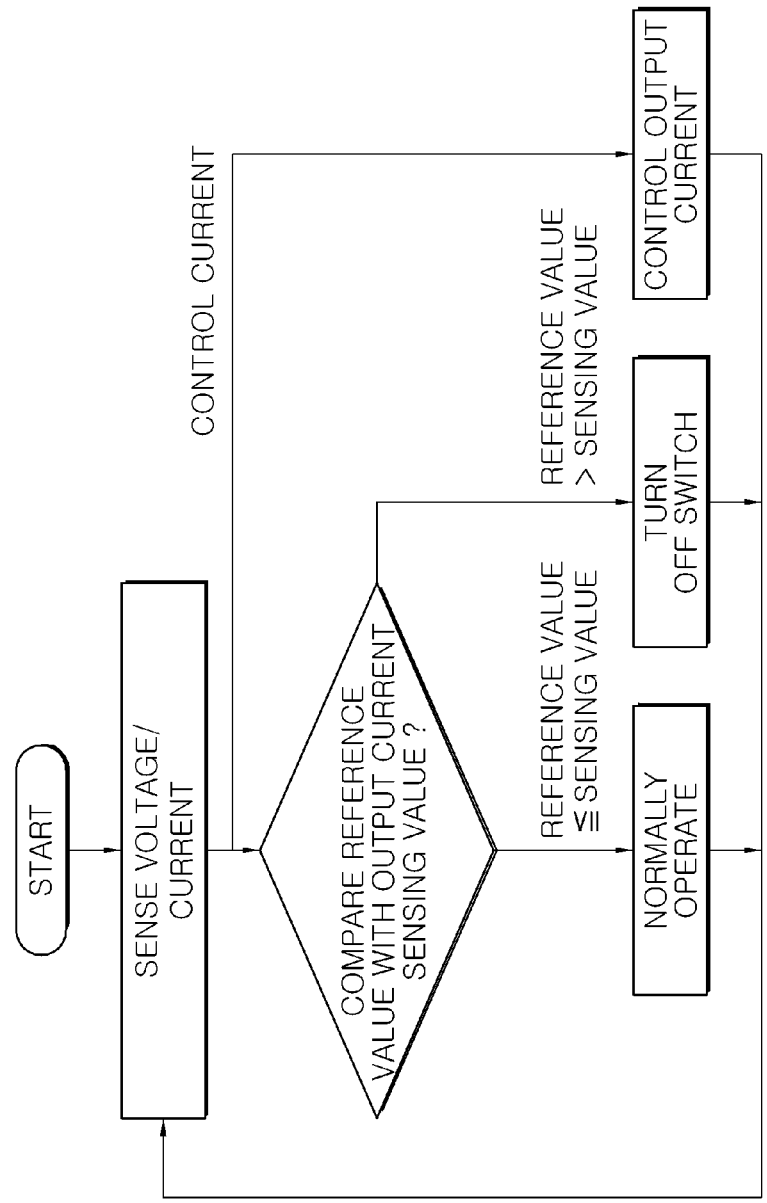
FIG. 3 is a flow chart illustrating a method for controlling a DC-DC converter shown in FIG. 2

FIG. 2 is a block diagram illustrating a DC-DC converter circuit and FIG. 3 is a flow chart illustrating a method for controlling a DC-DC converter shown in FIG. 2.

Referring to FIGS. 2 and 3, in the low voltage DC-DC converter 40, an output current of an output terminal 41 has a high current value DC. The forward converter type current/current sensing method of the low voltage DC-DC converter 40 is as follows. First, when the low voltage DC-DC converter 40 is normally operated, the output voltage/current of the output terminal 41 are sensed.

Further, the sensed current value is compared with a limited current value (reference value) for an overcurrent protection operation. When the sensed current value is higher than the reference value, an overcurrent protection switch 43 of the forward type low voltage DC-DC converter 40 is forcibly turned off. When the sensed current value is lower than the reference value, the forward type low voltage DC-DC converter 40 is normally operated. Here, the sensed current value is used to control the output current.

The forward type low voltage DC-DC converter 40 uses an expensive current sensor 42 to sense a high output current.

Figure 4:
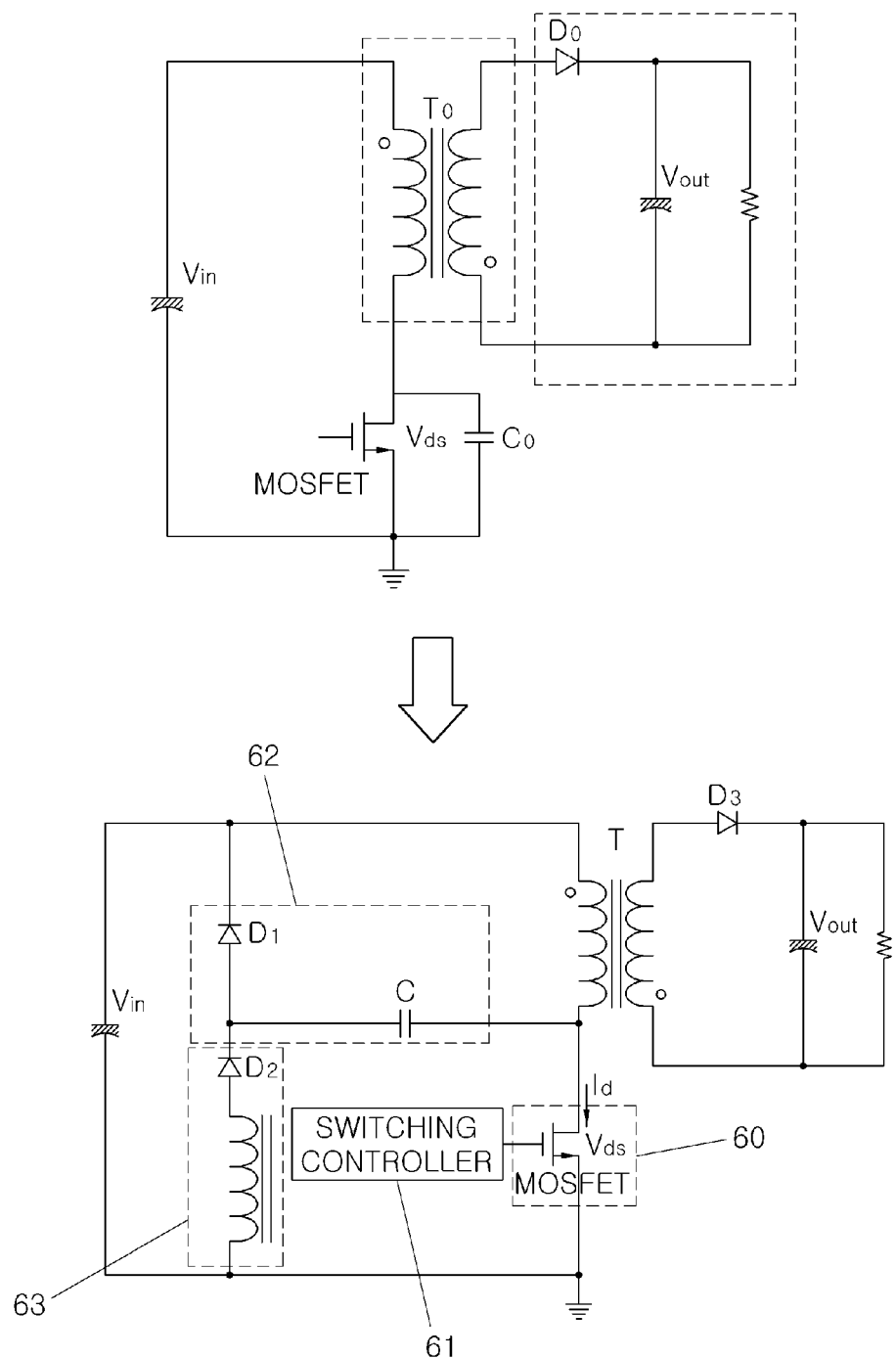
FIG. 4 is a block diagram illustrating a DC-DC converter circuit having an improved current sensing circuit as compared with the DC-DC converter circuit.

FIG. 4 is a block diagram illustrating a DC-DC converter circuit having an improved current sensing circuit as compared with the DC-DC converter circuit according to the related art. Referring to FIG. 4, the improved current sensing circuit is a fly-back type DC-DC converter and reduces an energy loss due to a switching on/off, thereby improving EMI characteristics.

However, the improved current sensing circuit includes a switching controller 61 which performs a switching operation of a switching unit 60 depending on a control signal, a first delay unit 62 which provides a discharge current at the time of a turn-on of the switching unit, and a second delay unit 63 which delays a current flowing in the switching unit due to the discharge current of the first delay unit at the time of the turn-on of the switching unit 60.

Therefore, the fly-back type DC-DC converter includes a plurality of circuits which have a different control scheme from the low voltage DC-DC converter for a vehicle and are added and therefore manufacturing costs of the DC-DC converter may be increased.

Hereinafter, a converter and a method for controlling the same according to an exemplary embodiment of the present invention will be described with reference to the accompanying drawings.

Figure 5:
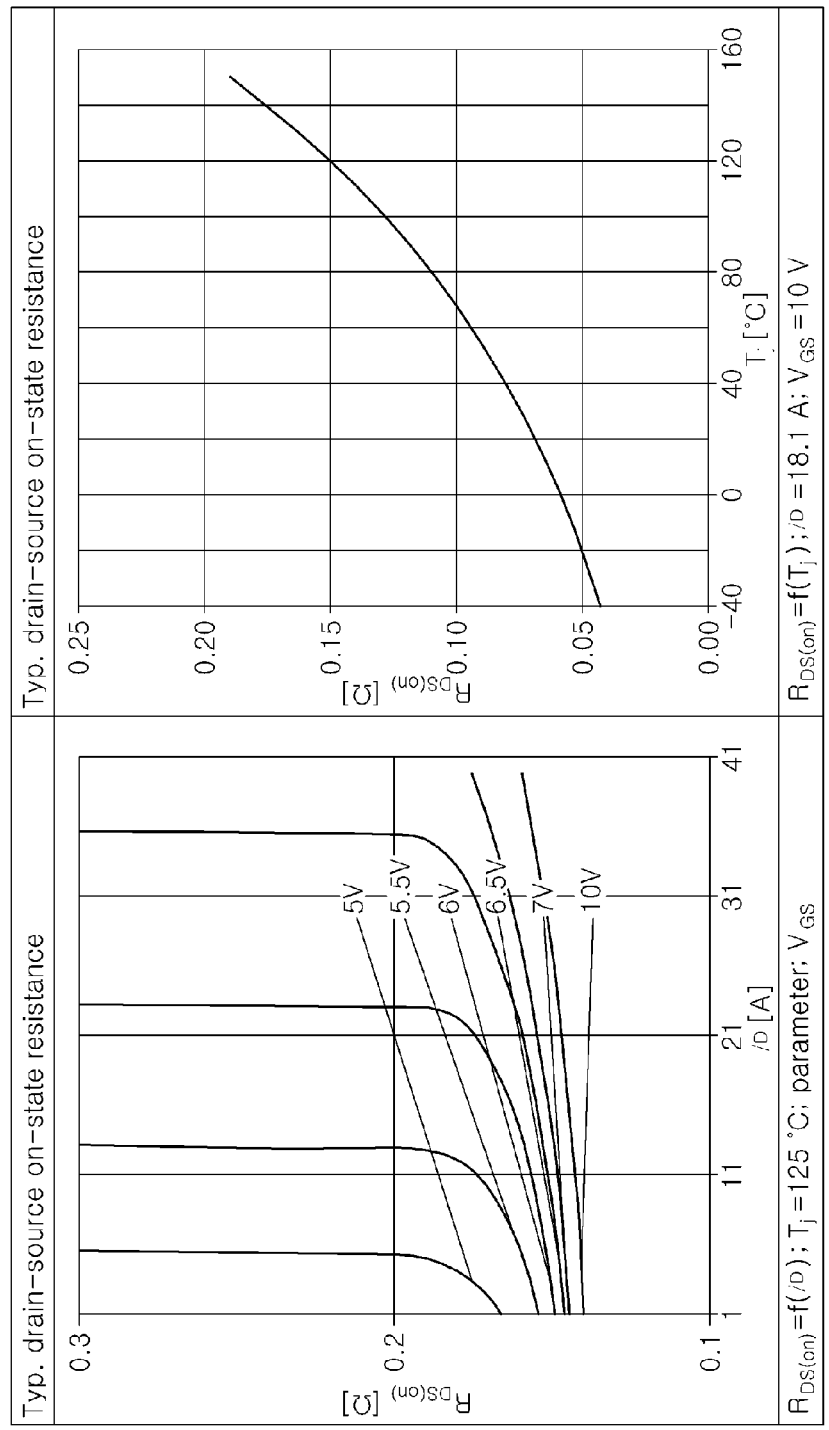
FIG. 5 is a diagram illustrating on resistance of an MOSFET of a comparator in an apparatus for sensing an output current of a DC-DC converter according to an exemplary embodiment of the present invention.
Figure 6:
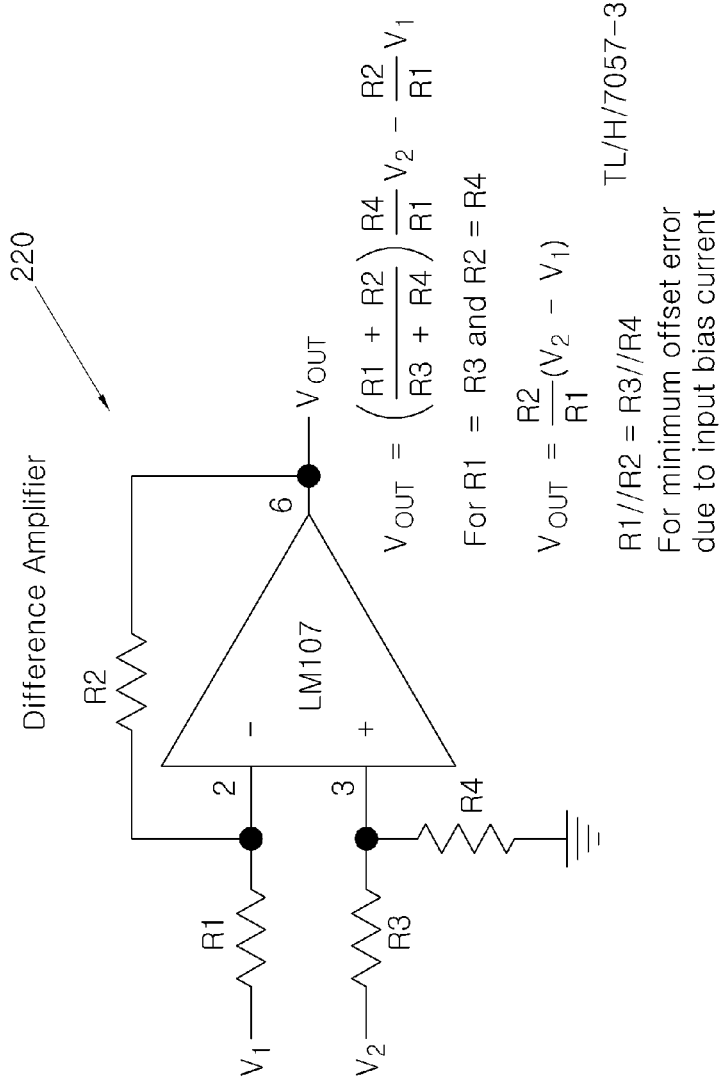
FIG. 6 is a diagram illustrating a circuit of the MOSFET of the comparator in the apparatus for sensing an output current of a DC-DC converter according to the exemplary embodiment of the present invention.
Figure 7:
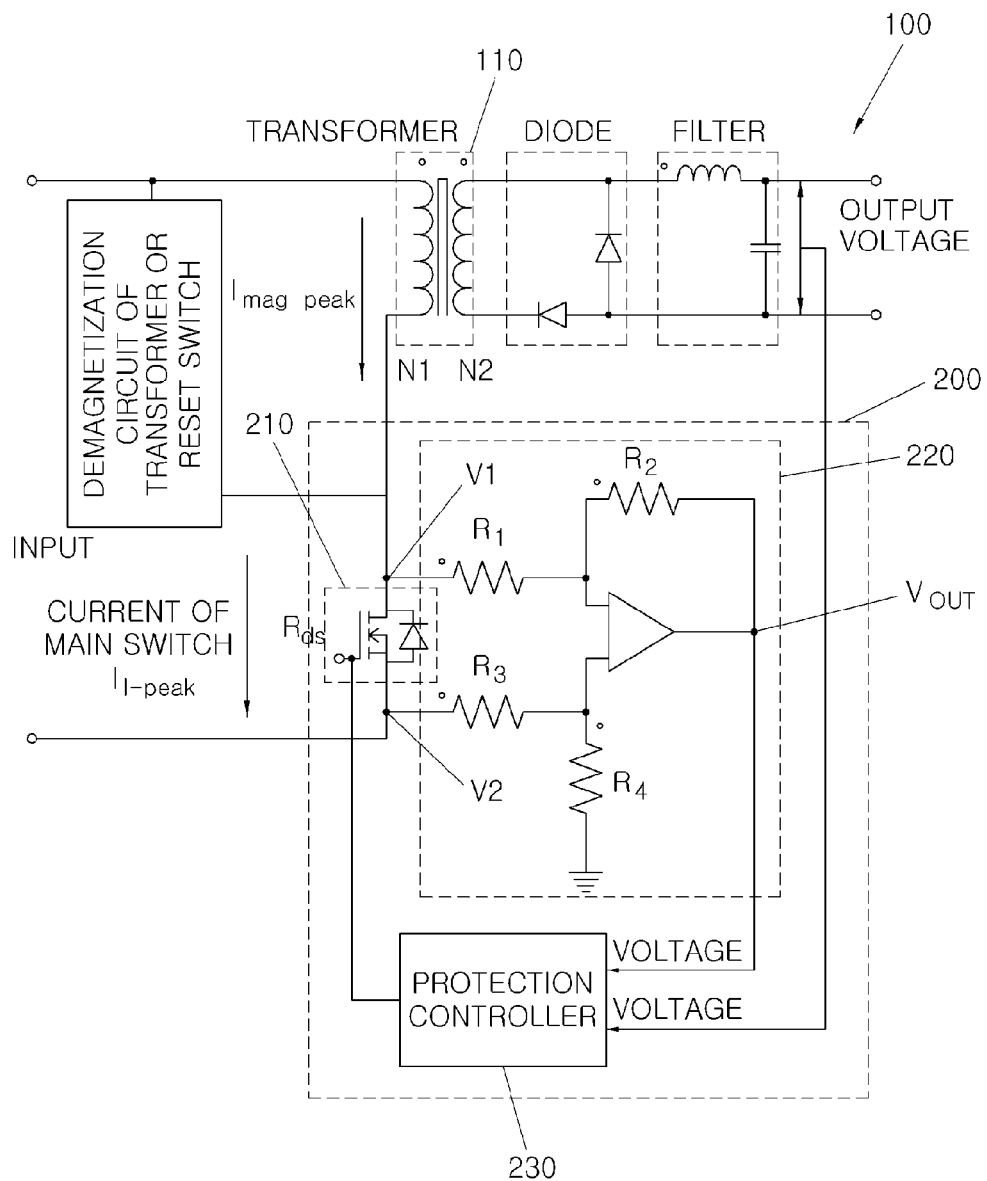
FIG. 7 is a diagram illustrating a structure of the DC-DC converter including the apparatus for sensing an output current of a DC-DC converter according to the exemplary embodiment of the present invention.

FIG. 5 is a diagram illustrating on resistance of a metal oxide semiconductor field effect transistor (MOSFET) of a comparator in an apparatus for sensing an output current of a DC-DC converter according to an exemplary embodiment of the present invention, FIG. 6 is a diagram illustrating a circuit of the MOSFET of the comparator in the apparatus for sensing an output current of a DC-DC converter according to the exemplary embodiment of the present invention, and FIG. 7 is a diagram illustrating a structure of the DC-DC converter including the apparatus for sensing an output current of a DC-DC converter according to the exemplary embodiment of the present invention.

Figure 8:
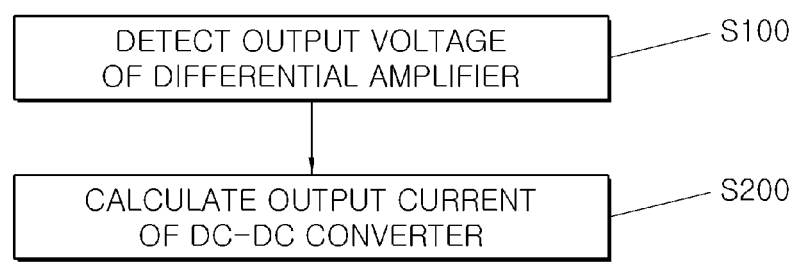
FIG. 8 is a flow chart illustrating a method for sensing an output current of a DC-DC converter according to an exemplary embodiment of the present invention.
Figure 9:
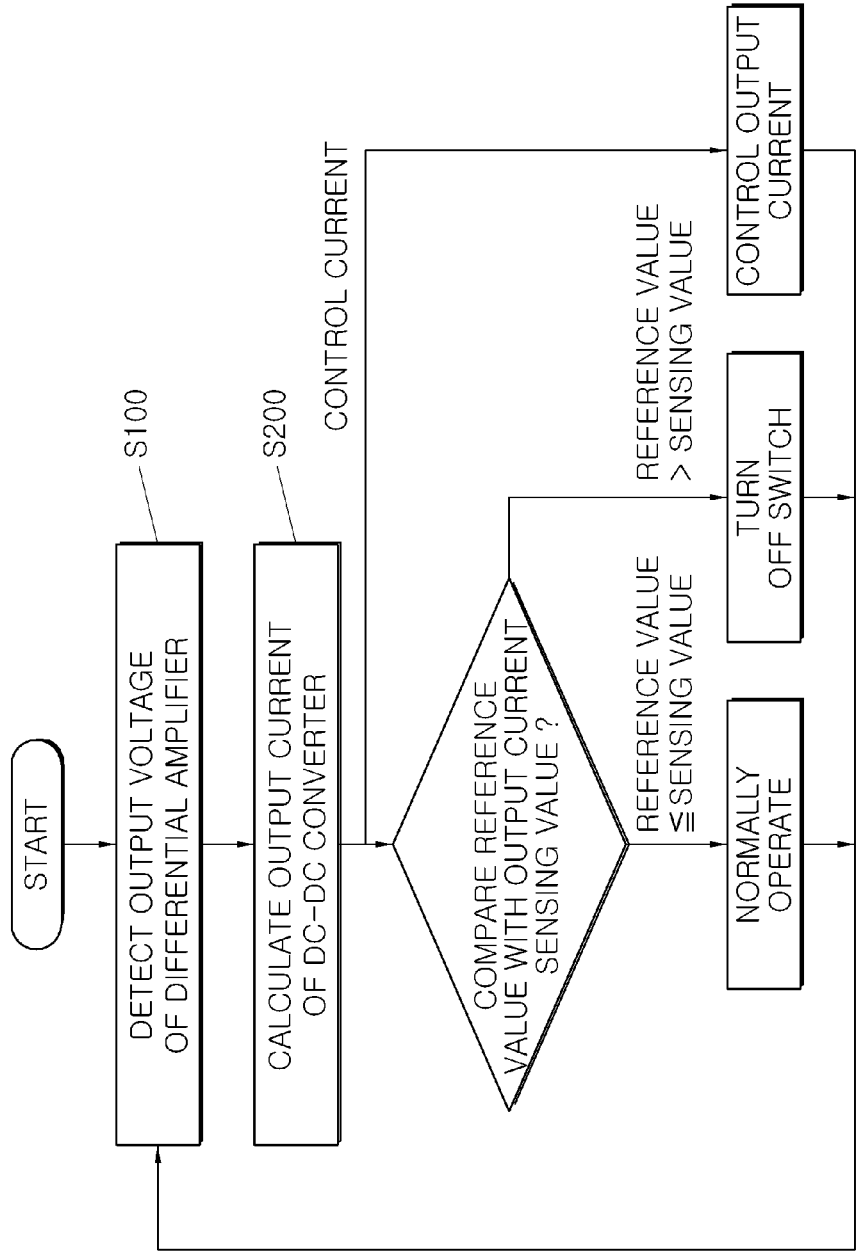
FIG. 9 is a diagram illustrating a method for controlling a DC-DC converter including the method for sensing an output current of a DC-DC converter according to the exemplary embodiment of the present invention.

FIG. 8 is a flow chart illustrating a method for sensing an output current of a DC-DC converter according to an exemplary embodiment of the present invention and FIG. 9 is a diagram illustrating a method for controlling a DC-DC converter including the method for sensing an output current of a DC-DC converter according to the exemplary embodiment of the present invention.

Referring to FIGS. 5 to 9, the method for sensing a current of a low voltage DC-DC converter according to the exemplary embodiment of the present invention may include detecting a current (S100) and converting an output current (S200).

In the detecting of the voltage (S100), a comparator 120 is installed at a primary side of a transformer 140 in the DC-DC converter and detects voltages V1 and V2 across the overcurrent protection switch 110 which protects the DC-DC converter from an overcurrent to calculate an output voltage $V_{OUT}$ of the comparator 120 and transmit the output voltage $V_{OUT}$ to a converter protection control apparatus 130.

That is, in the detection of the voltage (S100), to control the overcurrent protection switch 110, an output current 9 of the DC-DC converter is not directly detected like the related art but the comparator 120 detects voltages 4 and 5 across the overcurrent protection switch 110 installed at the primary side of the transformer 140 in the DC-DC converter 100 to calculate the output voltage $V_{OUT}$ of the comparator and transmit the output voltage $V_{OUT}$ to the converter protection control apparatus 130. Here, the overcurrent protection switch 110 may be a switch using a semiconductor, in particular, an MOSFET.

In the converting of the output current (S200), the converter protection control apparatus 130 uses the voltages V1 and V2 across the overcurrent protection switch 110 and the output voltage $V_{OUT}$ of the comparator to calculate a sensing value of the output current of the DC-DC converter. That is, in the converting of the output current (S200), the converter protection control apparatus 130 directly detects the output current of the DC-DC converter like the related art and does not control the overcurrent protection switch 110 using the output current but uses the voltages V1 and V2 across the overcurrent protection switch 110 and the output voltage $V_{OUT}$ of the comparator to calculate the output current of the DC-DC converter. Further, the converter protection control apparatus 130 uses the calculated output current to control the overcurrent protection switch 110.

In more detail, in the converting of the output current (S200), the converter protection control apparatus 130 may calculate an output current $I_{2\_peak}$ of the DC-DC converter depending on the following Equation 1.

$$I_{2\_peak} = (I_{1\_peak} sN) - I_{mag\_peak} \quad \text{[Equation 1]}$$

$$I_{1\_peak} = R_{ds}\left(V_{OUT} s \frac{R_1}{R_2}\right)$$

$$I_{1\_peak} = R_{ds}(V_2 - V_1)$$

In the above Equation 1, the $I_{2\_peak}$ represents a maximum output current calculation value of a secondary side of the transformer and $I_{1\_peak}$ represents a maximum current of a main MOSFET. Further, N is a turn ratio N1/N2 of the transformer and represents a constant value and $R_{ds}$ is drain-source on state resistance of the MOSFET and has a predetermined value depending on a current ($I_D$) value at a specific temperature ($T_j$=125 [° C.]) or a predetermined value depending on a temperature ($T_j$) at $I_D$=18.1 [A] and $V_{GS}$=10[V] as illustrated in FIG. 5.

Further, the $V_{OUT}$ is the output voltage $V_{OUT}$ of the comparator and may be calculated by the following [Equation 2], the V1 is the input voltage 4 of the MOSFET, the V2 may be measured as the output voltage of the main MOSFET, and $I_{mag\_peak}$ is an exciting current of the primary side of the transformer and represents a constant value depending on the transformer.

Referring to FIG. 6, when resistance of the comparator 120 is R1=R3 and R2=R4, the output voltage $V_{OUT}$ of the comparator depends on the following Equation 2.

$$V_{OUT} = \left(\frac{R_1 + R_2}{R_3 + R_4}\right)\frac{R_4}{R_1}V_2 - \frac{R_2}{R_1}V_1 \quad \text{[Equation 2]}$$

In the case of $R_1 = R_3$, $R_2 = R_4$, $$V_{OUT} = \frac{R_2}{R_1}(V_2 - V_1)$$

$$V_2 - V_1 = \frac{R_1}{R_2}V_{OUT}$$

In the above Equation 2, R1, R2, R3, and R4 are resistors configuring the comparator 120 and have a constant value.

If the output voltage $V_{OUT}$ of the comparator is substituted into the above Equation 1, the maximum current $I_{1\_peak}$ of the overcurrent protection switch according to the exemplary embodiment of the present invention and the calculated output current $I_{2\_peak}$ of the DC-DC converter according to the exemplary embodiment of the present invention may be obtained.

Referring to FIG. 9, the method for controlling a DC-DC converter including the method for sensing a current of a low voltage DC-DC converter according to the exemplary embodiment of the present invention replaces the sensing of the voltage/current in the method for controlling a DC-DC converter shown in FIG. 3. with the detecting of the voltage (S100) and the converting of the output current (S200). Further, the method for controlling a DC-DC converter including the method for sensing a current of the low voltage DC-DC converter according to the exemplary embodiment of the present invention performs the same step other than replacing the foregoing steps.

Hereinafter, an apparatus for sensing a current of a low voltage DC-DC converter according to an exemplary embodiment of the present invention will be described in more detail with reference to the accompanying drawings.

FIG. 5 is a diagram illustrating on resistance of an MOSFET of a comparator in an apparatus for sensing an output current of a DC-DC converter according to an exemplary embodiment of the present invention, FIG. 6 is a diagram illustrating a circuit of the MOSFET of the comparator in the apparatus for sensing an output current of a DC-DC converter according to the exemplary embodiment of the present invention, and FIG. 7 is a diagram illustrating a structure of the DC-DC converter including the apparatus for sensing an output current of a DC-DC converter according to the exemplary embodiment of the present invention.

Referring to FIGS. 5 to 7, the apparatus for sensing a current of a low voltage DC-DC converter according to the exemplary embodiment of the present invention may include an overcurrent protection switch 210, a comparator 220, and a protection controller 230.

The overcurrent protection switch 210 is installed at the primary side of the transformer 110 in the DC-DC converter to protect the converter 100 from an overcurrent. The converter 100 may be a DC-DC converter.

The case in which the output current of the DC-DC converter is larger than a reference value is determined as an overcurrent by the protection controller 230, and thus the overcurrent protection switch 210 is forcibly turned-off to protect the DC-DC converter 100. Here, the overcurrent protection switch 210 may be a switch using an MOSFET.

The comparator 220 is installed across the overcurrent protection switch 210 and detects the voltages V1 and V2 across the overcurrent protection switch to calculate the output voltage $V_{OUT}$ of the comparator and transmit the output voltage $V_{OUT}$ to the converter protection control apparatus 130.

That is, the comparator 120 is installed to detect the voltages V1 and V2 across the overcurrent protection switch 210 so that the protection controller 230 may calculate the output current of the DC-DC converter without directly detecting the output current of the DC-DC converter, thereby outputting the output voltage $V_{OUT}$ of the comparator and transmitting the output voltage $V_{OUT}$ of the comparator to the protection controller 230.

Here, the comparator 220 may have a predetermined value depending on the current ($I_D$) value at the specific temperature ($T_j$=125 [° C.]) as illustrated in FIG. 5. Further, the comparator 220 may have a predetermined value depending on the temperature ($T_j$) at the specific current ($I_D$=18.1 [A]) and the voltage ($V_{GS}$=10 [V]) as illustrated in FIG. 5.

The protection controller 230 uses the voltages V1 and V2 of the overcurrent protection $_{switch}$ and the output voltage $V_{OUT}$ of the comparator to calculate the output current of the DC-DC converter. That is, to control the overcurrent protection switch 210, the protection controller 230 does not directly detect the output current of the DC-DC converter like the related art but uses the voltages V1 and V2 across the overcurrent protection switch 210 and the output voltage $V_{OUT}$ of the comparator to calculate the output current of the DC-DC converter. Next, the protection controller 230 may use the calculated output current to control the overcurrent protection switch 210.

In more detail, the protection controller 230 may calculate the output current of the DC-DC converter depending on the following Equation 3.

$$I_{2\_peak} = (I_{1\_peak}sN) - I_{mag\_peak} \quad \text{[Equation 3]}$$

$$I_{1\_peak} = R_{ds}\left(V_{OUT}s\frac{R_1}{R_2}\right)$$

$$I_{1\_peak} = R_{ds}(V_2 - V_1)$$

In the above Equation 3, the $I_{2\_peak}$ represents the maximum output current calculation value of the secondary side of the transformer and $I_{1\_peak}$ represents the maximum current of the main MOSFET. Further, N is the turn ratio N1/N2 of the transformer and represents the constant value and $R_{ds}$ is the drain-source on state resistance of the MOSFET and has the predetermined value depending on the current ($I_D$) value at a specific temperature ($T_j$=125 [° C.]) or a predetermined value depending on a temperature ($T_j$) at $I_D$=18.1 [A] and $V_{GS}$=10[V] as illustrated in FIG. 5. Further, the $V_{OUT}$ is the output voltage $V_{OUT}$ of the comparator and may be calculated by the following [Equation 2], the V1 is the input voltage 4 of the MOSFET, the V2 may be measured as the output voltage of the main MOSFET, and $I_{mag\_peak}$ is the exciting current of the primary side of the transformer and represents the constant value depending on the transformer.

Referring to FIG. 6, when the resistance of the comparator 220 is R1=R3 and R2=R4, the output voltage $V_{OUT}$ of the comparator depends on the following Equation 2.

$$V_{OUT} = \left(\frac{R_1 + R_2}{R_3 + R_4}\right)\frac{R_4}{R_1}V_2 - \frac{R_2}{R_1}V_1 \qquad \text{[Equation 4]}$$

In the case of $R_1 = R_3$, $R_2 = R_4$, $$V_{OUT} = \frac{R_2}{R_1}(V_2 - V_1)$$

$$V_2 - V_1 = \frac{R_1}{R_2}V_{OUT}$$

In the above Equation 4, R1, R2, R3, and R4 are the resistors configuring the comparator 220 and have the constant value.

If the output voltage $V_{OUT}$ of the comparator is substituted into the above Equation 1, the maximum current $I_{1\_peak}$ of the overcurrent protection switch according to the exemplary embodiment of the present invention and the calculated output current $I_{2\_peak}$ of the DC-DC converter according to the exemplary embodiment of the present invention may be obtained.

According to the converter and the method for controlling the same in accordance with the exemplary embodiments of the present invention, it is possible to secure the same current sensing performance as the related art without using the expensive current sensor to sense the high output current of the DC-DC converter.

As described above, the exemplary embodiment of the present invention may be changed by those skilled in the art within the scope of the basic technical idea of the present invention and the scope of the present invention should be analyzed based on the appended claims.

What is claimed is:

1. A converter, comprising:
a transformer;
an overcurrent protection switch configured to be installed at a primary side of the transformer to prevent an overcurrent;
a comparator configured to detect voltages across the overcurrent protection switch to convert the detected voltage into an output current sensing value which becomes an output current calculation value of a secondary side of the transformer and compare the output current sensing value with a reference value; and
a protection controller configured to normally operate or forcibly turn off the overcurrent protection switch based on a comparison result of the comparator.

2. The converter of claim 1, wherein the protection controller normally operates the overcurrent protection switch in response to the output current sensing value being smaller than the reference value and forcibly turns off the overcurrent protection switch to prevent the overcurrent in response to the output current sensing value being larger than the reference value.

3. The converter of claim 1, wherein the overcurrent protection switch is a switch using a semiconductor.

4. The converter of claim 3, wherein the semiconductor is a Metal Oxide Semiconductor Field Effect Transistor (MOSFET).

5. The converter of claim 4, wherein the conversion of the detected voltage into the output current sensing value depends on the following Equation, $$I_{2\_peak} = (I_{1\_peak}sN) - I_{mag\_peak}$$

$$I_{1\_peak} = R_{ds}\left(V_{OUT}s\frac{R_1}{R_2}\right)$$

$$V_{OUT} = \frac{R_2}{R_1}(V_2 - V_1)$$

(In the above Equation, $I_{2\_peak}$ represents a maximum output current calculation value of a secondary side of the transformer, $I_{1\_peak}$ represents a maximum current of a main MOSFET, S is a constant power that equals the product of current and voltage input to and output from the transformer, N is a turn ratio N1/N2 of the transformer and has a constant value, $R_{ds}$ is drain-source on state resistance of the MOSFET and has a constant value, $V_{OUT}$ is an output voltage of the comparator, V1 represents an input voltage of the main MOSFET, V2 represents an output voltage of the main MOSFET, and $I_{mag\_peak}$ is an exciting current of the primary side of the transformer, and R1 and R2 represent resistance of the comparator).

6. The converter of claim 1, wherein the reference value is a predetermined value defined depending on temperature in a specific current and a specific voltage or is a predetermined value defined based on a current value at a specific temperature.

7. The converter of claim 1, wherein the comparator is formed of a differential amplifier.

8. A method for controlling a converter, comprising:
detecting voltages across an overcurrent protection switch installed at a primary side of a transformer to prevent an overcurrent;
converting, by a comparator, the detected voltage into an output current sensing value which becomes an output current calculation value of a secondary side of the transformer and compare the output current sensing value with a reference value; and
normally operating or forcibly turning off, by a protection controller, the overcurrent protection switch based on a comparison result of the comparator.

9. The method of claim 8, wherein the controlling includes: normally operating, by the protection controller, the overcurrent protection switch in response to the output current sensing value being smaller than the reference value; and
forcibly turning off the overcurrent protection switch to prevent the overcurrent in response to the output current sensing value being larger than the reference value.

10. The method of claim 8, wherein the overcurrent protection switch is a switch using a semiconductor.

11. The method of claim 10, wherein the semiconductor is a Metal Oxide Semiconductor Field Effect Transistor (MOSFET).

12. The method of claim 11, wherein the conversion of the detected voltage into the output current sensing value depends on the following Equation, $$I_{2\_peak} = (I_{1\_peak} sN) - I_{mag\_peak}$$
$$I_{1\_peak} = R_{ds}\left(V_{OUT} s \frac{R_1}{R_2}\right)$$
$$V_{OUT} = \frac{R_2}{R_1}(V_2 - V_1)$$

(In the above Equation, $I_{2\_peak}$ represents a maximum output current calculation value of a secondary side of the transformer, $I_{1\_peak}$ represents a maximum current of a main MOSFET, S is a constant power that equals the product of current and voltage input to and output from the transformer, N is a turn ratio N1/N2 of the transformer and has a constant value, $R_{ds}$ is drain-source on state resistance of the MOSFET and has a constant value, $V_{OUT}$ is an output voltage of the comparator, V1 represents an input voltage of the main MOSFET, V2 represents an output voltage of the main MOSFET, and $I_{mag\_peak}$ is an exciting current of the primary side of the transformer, and R1 and R2 represent resistance of the comparator).

13. The method of claim 8, wherein the reference value is a predetermined value defined depending on temperature in a specific current and a specific voltage or is a predetermined value defined based on a current value at a specific temperature.

14. The method of claim 8, wherein the comparator is formed of a differential amplifier.

* * * * *